Figure 1:
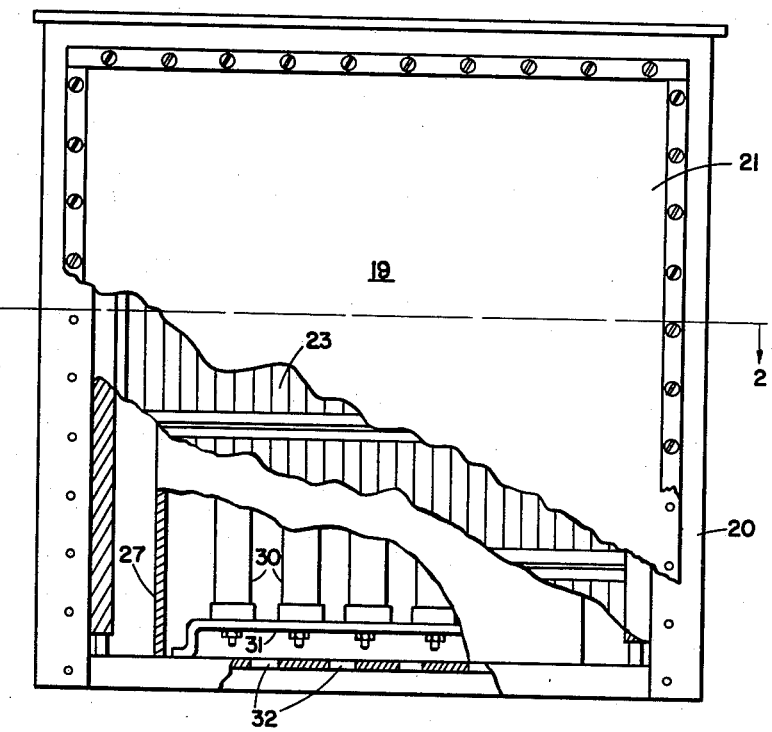

March 31, 1964

A. W. ELSTON ETAL 3,127,527

CONTROL APPARATUS

Filed Dec. 1, 1961

3 Sheets-Sheet 1

INVENTORS
ALVIN W. ELSTON
GORDON A. VINCENT

BY Roger W. Jensen

ATTORNEY.

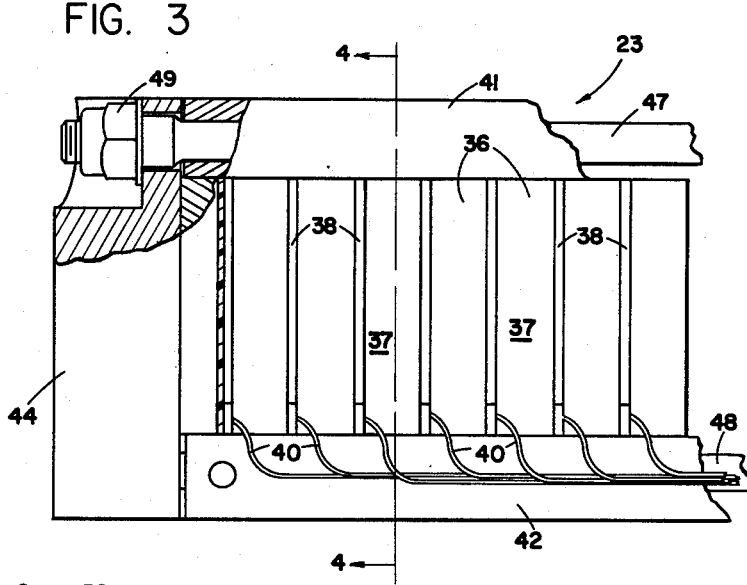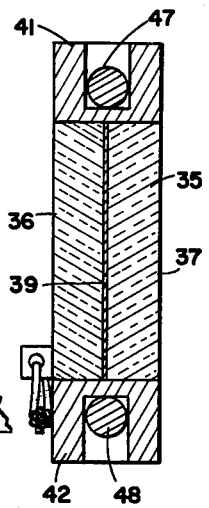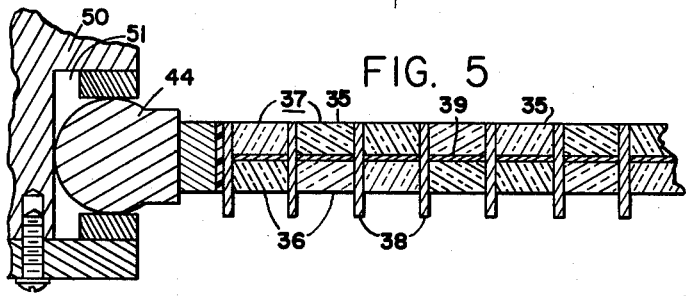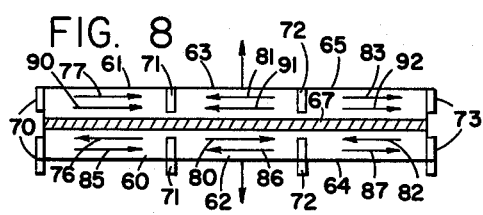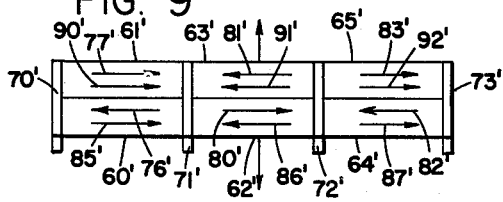

United States Patent Office 3,127,527
Patented Mar. 31, 1964

3,127,527
CONTROL APPARATUS
Alvin W. Elston and Gordon A. Vincent, Seattle, Wash., assignors to Minneapolis-Honeywell Regulator Company, Minneapolis, Minn., a corporation of Delaware
Filed Dec. 1, 1961, Ser. No. 156,209
7 Claims. (Cl. 310—8.6)

This invention pertains to improvements in electromechanical transducers and more particularly to improvements in high power, low frequency, comparatively low weight crystal transducers.

In prior art transducers, hydraulic, magnetomotive or magnetostrictive principles have been used to produce high power outputs. However, these types of transducers have serious disadvantages such as excessive weight, low efficiency, and the need for elaborate subsystems to compensate for environmental variations.

The present invention utilizes low frequency ceramic crystal bender bars to provide a low frequency, high power piezoelectric transducers. Each of the bender bar crystals has two major surfaces and two minor surfaces and produces a mechanical strain when subjected to an electrical strain. The bender bar comprises a plurality of crystals arranged in a first and a second row. The adjacent crystals in each row are positioned so as to have minor surfaces contiguous and the first and second rows are positioned so that the crystals in the two rows have major surfaces contiguous.

Two bender bars are connected in spaced apart relationship by means of common end supports connected to each end of the two bars. The two spaced apart bender bars form a transducer module.

An electric field is applied to the bender bars so that one row of crystals of each bar expands while the other row contracts thereby causing a bending or flexing of the bar.

The transducer combines a plurality of transducer modules mounted inside of a hull or transducer housing. A free flooding chamber is positioned in the area within the spaced apart bender bars, and the area between the inner walls of the transducer housing and the outer faces of the bender bars, and the area between the inner faces of the bender bars and the walls of the free flooding chamber, are filled with a liquid such as silicon oil. The flexible steel free flooding chamber acts to equalize the internal pressure of the transducer with the external pressure of the surrounding ocean, thereby preventing deformation of the transducer as the external pressure is varied due to changes in transducer depth. However, the free flooding chamber creates a problem in that a vibrating bar exposed to water on both sides represents a nonradiating dipole. An acoustic dipole is two point sources separated in space. If this separation is small compared to a wave length of sound in water, there will be no directionality to the dipole. If both sources are radiating in phase, at the same frequency, the dipole becomes merely a simple monopole source. However, if the sources are 180° out of phase the two waves cancel and no radiation is possible. To prevent cancellation of the transducer radiation, compliant gas filled tubes are placed in the free flooding chamber very close to the inner face of the bender bar. In this near field, pressure cannot build up in the water because the tubes immediately relieve this pressure. The system now acts as a monopole radiator. If only partial pressure relief is achieved, some cancellation will occur and, as a result, more total motion is required from the transducer to radiate a given power. For this reason it is important that a high degree of pressure relief is accomplished. As hydrostatic pressure is increased, the tubes compress and become stiffer. It is necessary for the tubes to still remain compliant at lower depths compared to the mechanical compliance of the bender bars. If not, the resonant frequency of the transducer increases.

The compliant tubes are explained and claimed in a co-pending application of Alvin W. Elston and Gordon A. Vincent Serial No. 156,409, filed December 1, 1961, and assigned to the same assignee as the present invention.

It is one object of our invention, therefore, to provide an improved crystal transducer.

Another object of our invention is to provide an improved crystal transducer capable of producing a low frequency, high power output.

A further object of our invention is to provide a transducer utilizing a crystal bender bar comprising two rows of oppositely polarized contiguous crystals.

Figure 2:
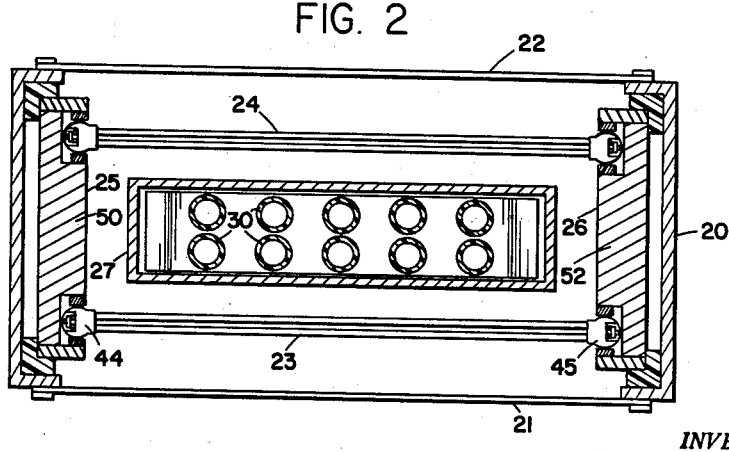
Figure 10:
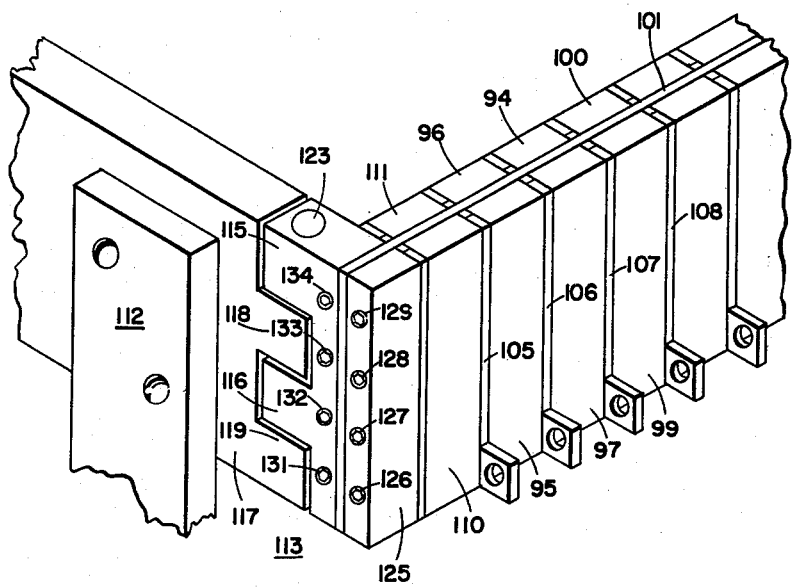

These and other objects of our invention will become apparent to those skilled in the art upon consideration of the accompanying specification, claims and drawings of which:

FIGURE 1 shows a cutaway view of the transducer;
FIGURE 2 shows a cross section of the transducer of FIGURE 1;
FIGURE 3 shows a portion of the bender bar;
FIGURE 4 shows a section view of the bender bar of FIGURE 3;
FIGURE 5 shows the hinge arrangement for the bender bar;
FIGURE 6 shows a vibration pattern for the bender bar when the ends of the bar are rigidly fixed;
FIGURE 7 shows the vibration pattern of the bender bar when the ends of the bar are supported so as to be free to move both rotationally and longitudinally with respect to each other;
FIGURE 8 shows the direction of polarization and the direction of the applied electric field to the various crystals of the bender bar, and further shows the various crystals bonded to the opposite sides of a steel flexing plate.
FIGURE 9 shows the direction of polarization and the instantaneous direction of the applied electric field in the various bender bar crystals, and further shows the various crystals being bonded to each other rather than to a steel flexing plate; and
FIGURE 10 shows a second modification of a hinge arrangement for the bender bar, and further shows a means for applying an electric field to the various bender bar crystals.

Referring to FIGURES 1 and 2, there is shown a transducer 19 having a wall or transducer housing 20, and further having front and back cover plates or windows 21 and 22 which can be made from any suitable material, such as rubber or flexible steel. A plurality of transducer modules comprising a first bender bar 23 and a second bender bar 24 are mounted in a spaced apart relationship by means of a pair of end supports 25 and 26 which in turn are suitably attached to housing 20. The mounting of bender bars 23 and 24 is such that they are substantially parallel to one another and to the flexible cover plates 21 and 22. A free flooding chamber 27 is positioned in the space between bender bars 23 and 24. A plurality of gas filled compliant tubes 30 are mounted inside of the free flooding chamber 27 and are held in position by means of a lower support bracket 31 and an upper support bracket not shown. A plurality of holes 32, in the bottom of the transducer 20, allow the free flooding chamber 27 to fill with water when the transducer is submerged. The remainder of the transducer is filled with a liquid such as silicon oil. The bender bar construction and mounting means is explained more fully hereinafter.

FIGURES 3 and 4 show the construction of the bender bar 23 of FIGURE 1. It will be understood that bender bars 23 and 24 are identical. First and second polarized crystals, such as polarized barium titanate crystals, 35 and 36 each having two major surfaces and two minor surfaces, are bonded together by means of a non-conducting adhesive 39 so as to have major surfaces contiguous. These back-to-back bonded crystal pairs form a crystal module 37. A plurality of these crystal modules are connected in a row by bonding each crystal module, by means of a conductive adhesive, to a beryllium copper insert 38 between each module, the minor surfaces of the crystals being bonded to the copper. An electric field is applied to each of the crystal modules by means of conductors 40 connected to the copper inserts.

A pair of guide rails 41 and 42 are respectively bonded to the longitudinal edges of the crystal bar. Guide rails 41 and 42 can be made from any suitable material such as fiberglass or epoxy glass. An elongated end member 44, having a substantially bulb-shaped cross section, is positioned at the end of the crystal beam and is held in position by means of a pair of external stress rods 47 and 48, stress rod 47 passing through end member 44 and guide rail 41, and stress rod 48 passing through end member 44 and guide rail 42. A similar end member 45 (see FIGURE 2) is connected to the other end of the crystal beam. End members 44 and 45 are held in position by suitable means such as adjusting nut 49. The crystal modules 37 of a bender bar are subjected to a substantial compressive force by the adjustment of nuts 49. The magnitude of this compressive force is such that during the maximum bending or flexing of the bender bar the crystals will still experience compression. This is necessary since while the crystals can withstand severe compressive forces, they can withstand only relative small tensile forces.

Referring to FIGURE 5 there is shown, in cross section, a hinge, or bearing arrangement for connecting the bender bar to an end support bracket 50. Bender bar end member 44 is mounted in a substantially C-shaped socket member 51 of end support 50. Socket member 51 allows end member 44 to rotate when the bender bar flexes, and also allows the end member to move linearly in the longitudinal direction of the bender bar. A similar end support bracket 52 (see FIGURE 2) is connected to the other end of the bender bar.

The reason that the end member must be allowed to move both rotationally and linearly is that as the bender bar flexes, that is, moves in a transverse direction, the linear distance between its extreme ends decreases from its normal distance. To explain this more fully, the distance between the bender bar ends, when the bar is not electrically energized, is the distance along a straight line joining the two end members. When the bender bar is energized, the distance between the ends becomes the cord of some arc. This cord dimension is shorter than the normal straight line dimension and, therefore, to prevent energy from being used to stretch the support bracket, a bearing providing linear movement as well as rotational movement is required.

FIGURE 6 shows the vibration pattern for the bender bar when the ends of the bar are rigidly fixed. When the bender bar is mounted in this manner it behaves like a fixed beam in bending. As stated previously, this type of bender bar mounting is unsatisfactory since the support brackets absorb an excessive amount of power.

FIGURE 7 shows the vibration pattern of the bender bar when the ends of the bar are supported so as to be free to move both rotationally and longitudinally with respect to each other. The bender bar therefore has high efficiency and low mechanical loss, and transfers maximum power to the surrounding medium.

As explained previously, the bender bar, which forms one-half of a transducer module, is a prestressed crystal or ceramic beam. The bender bar is constructed by bonding a series of ceramic elements to each other or, in an alternative method, to both sides of a ground steel plate.

FIGURE 8 shows the direction of polarization and the direction of the applied electric field to the various crystals of the bender bar, and further shows the various crystals bonded to the opposite sides of a steel plate.

Referring to FIGURE 8 there is shown a plurality of crystals 60, 61, 62, 63, 64 and 65, each having two major surfaces and two minor surfaces. Crystals 60 and 61 are bonded, by means of a nonconductive adhesive, to opposite sides of a flexible steel plate 67, the crystals being positioned so as to have major surfaces contiguous. A pair of conductive inserts 70 and 71, such as beryllium copper plates, are bonded, by means of a conductive adhesive, to minor surfaces of crystals 60 and 61, the conductive inserts being insulated from steel plate 67. Crystals 62 and 63 are also bonded, in a manner similar to crystals 60 and 61, to opposite sides of steel plate 67, a minor surface of crystals 62 and 63 also being bonded to the conductive insert 71. A conductive insert 72 is bonded, by means of a conductive adhesive, to the minor surfaces of crystals 62 and 63. Similarly, crystals 64 and 65 are bonded to opposite sides of steel plate 67 and to the conductive insert 72. A conductive insert 73 is bonded to minor surfaces of crystals 64 and 65.

From the above description it can be seen that crystals 60, 62 and 64 form a first crystal row bonded to one side of steel plate 67, while crystals 61, 63 and 65 form a second crystal row bonded to the opposite side of steel plate 67.

Crystals 60 and 61 are oppositely polarized in directions parallel to the steel plate, as shown by arrows 76 and 77. Crystals 62 and 63 are oppositely polarized in directions parallel to the steel plate, but in a sense respectively opposite to crystals 60 and 61, as shown by arrows 80 and 81. In other words, crystal 62 is polarized in a sense opposite to the polarization of crystal 60 and crystal 63 is polarized in a sense opposite to crystal 61. Similarly, crystals 64 and 65 are oppositely polarized and in a sense respectively the same as crystals 60 and 61, that is, crystal 64 is polarized in the same sense as crystal 60 and crystal 65 is polarized in the same sense as crystal 61 as shown by arrows 82 and 83. From the above explanation it can be seen that adjacent crystals in each row are oppositely polarized.

The conductive inserts 70, 71, 72 and 73 are adapted to be connected to a source of control signals (not shown). If the instantaneous polarity of the control signal is such that inserts 70 and 72 are positive while inserts 71 and 73 are negative then the direction of the applied electric fields in crystals 60, 62 and 64 will be opposite to the direction of crystal polarization, as shown by arrows 85, 86 and 87 of crystals 60, 62 and 64, respectively, while the direction of the applied electric fields in crystals 61, 63 and 65 will be in the same direction as crystal polarization, as shown by arrows 90, 91 and 92 of crystals 61, 63 and 65, respectively.

The application of an electric field opposite to the direction of crystal polarization causes the crystal to contract along the direction of polarization while conversely, the application of an electric field in the direction of crystal polarization causes the crystal to expand along the direction of polarization.

Since the direction of the applied electric field in crystals 60, 62 and 64 is opposite to the direction of polarization, these crystals will contract, while, since the direction of the applied electric field in crystals 61, 63 and 65 are in the same direction as the direction of polarization, these crystals will expand. The contraction of crystals 60, 62 and 64, on one side of steel plate 67, and the expansion of crystals 61, 63 and 65, on the other side of steel plate 67, will cause plate 67 to flex or bend. When the polarity of the signal on inserts 70, 71, 72 and 73 reverses, the direction of the electric fields in the crystals also reverses and the plate will flex, or bend, in the opposite direction. If the direction of the electric fields applied to the crystals is periodically reversed, the bender bar will continuously vibrate.

FIGURE 9 shows a bender bar substantially identical to the bar shown in FIGURE 8, with the exception that the crystals are bonded to each other rather than to a flexible steel plate. The theory of operation of the bar of FIGURE 9 is the same as for the bar of FIGURE 8 and therefore will not be further explained. The element numerical designations of FIGURE 9 are the same as for FIGURE 8 except that a prime (') has been added.

FIGURE 10 shows another hinge arrangement for the bender bar. Referring to FIGURE 10 there is shown a plurality of crystal pairs comprising crystals 95 and 96, 97 and 98, and 99 and 100. The crystals of each crystal pair are bonded to opposite sides of a flexible steel plate 101, and the crystal pairs are separated by a conductive insert 105, 106, 107 and 108, as explained in the description of FIGURE 8. A pair of metal spacers 110 and 111 are positioned, on opposite sides of plate 101, between the first conductive insert 105 and an end support 112. The metal spacers are insulated from conductive insert 105.

A hinge 113 comprises a first member having a longitudinal portion 114 from which extends a first transverse portion 115 and a second transverse portion 116, and a second member having a main portion 117 from which extends a first transverse portion 118 and a second transverse portion 119. The first and second hinge members are positioned so that the transverse portions 115, 116, 118 and 119 mesh, and a pin 123 extends through the transverse portions thereby allowing rotational movement around the pin axis. The longitudinal portion 114 of the first hinge member is welded, or similarly attached, to one side of the end of plate 101. A steel bar 125 is welded, or similarly attached, to the other side of the end of plate 101. A first plurality of set screws 126, 127, 128 and 129 passed through bar 125 and made contact with spacer 110, while a second plurality of set screws 131, 132, 133 and 134 pass through the longitudinal portion 114 of the first hinge member and make contact with spacer 111. The set screws are adjusted so as to apply a substantial compressive force to the crystals of the bender bar.

Referring again to FIGURES 1 and 2, the operation of the transducer is as follows. As the transducer is lowered in the water, the free flooding chamber 27 fills with water through holes 32 in the transducer bottom, and equalizes the internal and external pressures on the transducer.

When the transducer is transmitting, the bender bars 23 and 24 operate in unison, that is, they either move in an outward direction or an inward direction at the same time. As either of the bender bars vibrate it creates a positive and negative pressure wave of equal amplitude. For instance, as bender bar 23 moves in an outward direction it creates a positive pressure wave in the surrounding water while, at the same time, it creates a negative pressure wave in the free flooding chamber 27. Since the wave length of sound is long compared to the physical dimensions of the source, these pressure waves would cancel and no radiation would result. To prevent this, a pressure relief surface is required in the free flooding region 27 between opposing transducer faces. This is accomplished by the use of sealed, air filled, or gas filled compliant tubes 30. As the bender bar vibrates, the compliant tubes 30 either expand or contract, depending upon the direction of movement of the bender bar, and immediately relieve the pressure wave which the transducer movement tends to set up in the free flooding chamber 27.

It is to be understood that while we have shown a specific embodiment of our invention that it is for the purpose of illustration only, and that our invention is to be limited solely by the scope of the appended claims.

We claim as our invention:

1. An electromechanical transducer comprising: a flexible ceramic beam, said beam being formed from a plurality of individual ceramic elements which produce a mechanical strain when an electrical stress is applied, said elements being arranged in a first and a second row, each of said elements having two major surfaces and two minor surfaces, each of said elements within said rows being positioned to have minor surfaces contiguous, and said first row being positioned adjacent said second row so as to have major surfaces contiguous; bearing means affixed to opposite ends of said ceramic beam; and support means adapted to cooperate with said bearing means to permit flexure of said ceramic beam when an electrical stress is applied.

2. An electromechanical transducer comprising, a flexible ceramic beam, said beam being formed from a plurality of individual ceramic elements which produce a mechanical strain when an electrical stress is applied, said elements being arranged in a first and a second row, each of said elements having two parallel major planar surfaces and two parallel minor planar surfaces, each of said elements within said rows being positioned to have minor planar surfaces contiguous, said first row being positioned adjacent said second row so as to have major planar surfaces contiguous; bearing means affixed to opposite ends of said ceramic beam; and support means adapted to cooperate with said bearing means to permit flexure of said ceramic beam when an electrical stress is applied.

3. An electromechanical transducer comprising, a flexible ceramic beam, said beam being formed from a plurality of individual piezoelectric elements arranged in a first and a second row, each of said elements having two major surfaces and two minor surfaces, each of said elements within said rows being positioned so as to have minor surfaces contiguous, said first row being positioned adjacent said second row to have major surfaces contiguous; bearing means affixed to opposite ends of said beam; stress means, said stress means being adapted to apply a compressive force to said rows; and support means adapted to cooperate with said bearing means to permit flexure of said ceramic beam.

4. An electromechanical transducer comprising: a flexible ceramic beam, said beam being formed from a plurality of individual piezoelectric elements arranged in a first and a second row, each of said elements having two major surfaces and two minor surfaces, each of said minor surfaces having electrodes associated therewith, each of said elements within said rows being positioned so as to have minor surfaces contiguous, and said first row positioned adjacent said second row so as to have major surfaces contiguous; stress rod means; guide channel means; bearing means; said stress rod means affixing said bearing means to said beam and cooperating with said guide channel means to apply a compressive force to said elements; and support means adapted to cooperate with said bearing means to permit flexure of said ceramic beam.

5. An electromechanical transducer comprising: a flexible ceramic beam, said beam being formed from a plurality of individual piezoelectric elements arranged in a first and a second row, each of said elements having two major surfaces and two minor surfaces, each of said minor surfaces having electrodes associated therewith, each of said elements within said rows being positioned so as to have minor surfaces contiguous, and said first row being positioned adjacent said second row so as to have major surfaces contiguous; a pair of stress rods; a pair of guide channels each being individually bonded to opposite longitudinal edges of said beam; a pair of bearing means for each end of said beam; said stress rods affixing said bearing means to opposite ends of said beam through said guide channels and further applying a compressive force to said elements; and support means adapted to cooperate with said bearing means to permit flexure of said ceramic beam.

6. In an electromechanical transducer of the flexible ceramic beam type in which said beam is formed from a plurality of individual ceramic elements which produce a mechanical strain when an electrical stress is applied, said elements being arranged in two contiguous rows, said elements within said rows further being positioned in contiguous relationship, the combination comprising: a first and a second ceramic beam, said beams each having bearing means at opposite ends; a fastening member for each of said beams, said fastening member being so arranged with each beam so as to affix said bearing means to said beam; and end support means, said end support means being adapted to cooperate with said bearing means of said first and second ceramic beams so as to permit said beams to flex when stressed electrically and further being adapted to position said beams in spaced parallel relationship.

7. In an electromechanical transducer of the flexible ceramic beam type in which said beam is formed from a plurality of individual piezoelectric elements having electrodes associated therewith and being arranged in two contiguous rows, said elements within said rows further being positioned in contiguous relationship, the combination comprising: a first and a second ceramic beam, said beams each having bearing means at opposite ends; a stress member for each of said beams, said stress member being so arranged with each beam so as to affix said bearing means to said beam and to apply a compressive force to said ceramic elements; and end support means, said end support means being adapted to cooperate with said bearing means of said first and second ceramic beam so as to permit said beams to flex and further being adapted to position said beams in spaced parallel relationship.

References Cited in the file of this patent

UNITED STATES PATENTS

| | | |
|---|---|---|
| 2,448,365 | Gillespie | Aug. 31, 1948 |
| 2,640,165 | Howatt | May 26, 1953 |

FOREIGN PATENTS

| | | |
|---|---|---|
| 678,825 | Great Britain | Sept. 10, 1952 |